Figure 1:
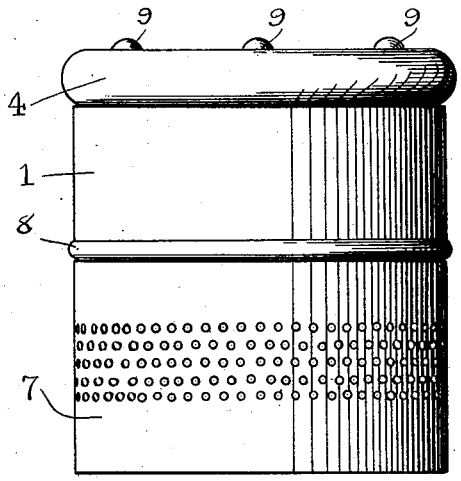

J. PRICE & W. G. WINTER.
FUMIGATOR.
APPLICATION FILED NOV. 18, 1912.

1,082,097.

Patented Dec. 23, 1913.

Witnesses
Ray W. Longfield
Palmer A. Jones

Inventors
James Price and
William G. Winter
By Luther V. Moulton
Attorney

UNITED STATES PATENT OFFICE.

JAMES PRICE AND WILLIAM G. WINTER, OF HOLLAND, MICHIGAN.

FUMIGATOR.

1,082,097.      Specification of Letters Patent.      Patented Dec. 23, 1913.

Application filed November 18, 1912. Serial No. 732,116.

*To all whom it may concern:*

Be it known that we, JAMES PRICE and WILLIAM G. WINTER, citizens of the United States of America, residing at Holland, in the county of Ottawa and State of Michigan, have invented certain new and useful Improvements in Fumigators; and we do hereby declare the following to be a full, clear, and exact description of the invention, such as will enable others skilled in the art to which it appertains to make and use the same.

Our invention relates to improvements in fumigators, and more particularly to that class of fumigators wherein heat is applied to evaporate the germicide, and its object is to provide a container for transporting both the germicide and the fuel by which it is evaporated, and to adapt the container to be converted into a burner and evaporating pan for use in evaporating the germicide; and to provide a device combining these features which may be cheaply and easily constructed, which shall be simple and effective in operation, which may be readily and safely used by the novice, and furthermore, to provide such device with various other new and useful features as hereinafter more fully described and particularly pointed out in the claim.

It has been found that there is a general demand for a simple, safe and effective fumigator which is inexpensive and adapted to be put into effective use by an inexperienced person, and which will perform its function without entailing the danger of accidental conflagrations, explosions, etc.

Our invention supplies all of these various requirements, and comprises a cup-like germicide receptacle to contain the germicide which is preferably of a semi-solid nature, and which is adapted to be evaporated by applying heat thereto. This germicide receptacle also serves as an evaporating pan when the fumigator is in operation. A fuel receptacle is also provided which is of a shallow cup-like form and contains the fuel which is preferably paraffin or like inflammable substance having a wick embedded therein. This fuel receptacle is adapted to be inverted and fit over the germicide receptacle to form a closure for the same during transportation of the device. In operating this device as a fumigator the fuel receptacle is placed beneath the germicide container, the said container being supported by a drum which surrounds its lower portion and extends downward therefrom and is adapted to receive the fuel receptacle at its lower end. The drum serves as a body for the burner and is provided with a multiplicity of perforations to admit air to the burning fuel, and also act as a fire stop, preventing the flame from escaping outside of the perforated drum and igniting the gases which arise from the germicide.

Figure 2:
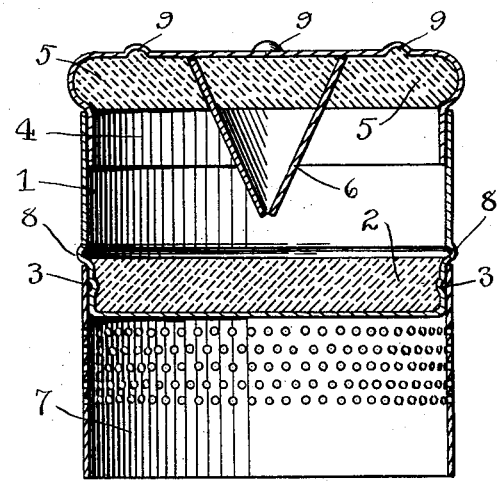
Figure 3:
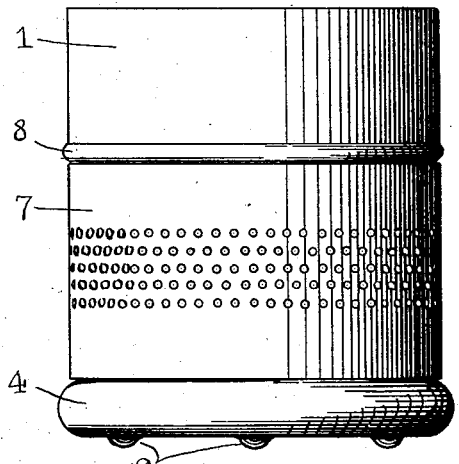
Figure 4:
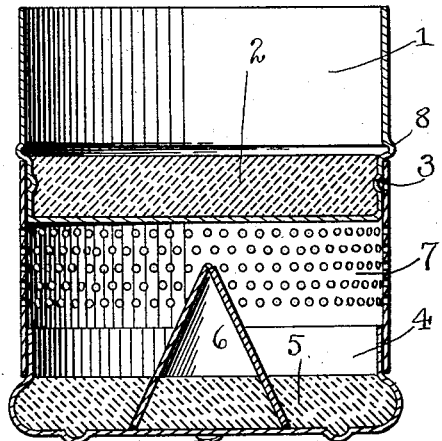

The device is provided with various other novel features of construction and arrangement as will more fully appear by reference to the accompanying drawings; in which, Figure 1 is a side elevation of a device embodying our invention assembled for transportation; Fig. 2 is a sectional elevation of the same; Fig. 3 is a side elevation of the device ready for operation; and, Fig. 4 is a sectional elevation of the same.

Like numbers refer to like parts in all of the figures.

1 represents the cylindrical cup-shaped germicide container which is partially filled with the germicide 2, which in the form shown, has been poured into the retainer in a molten state, and in its cooled and sufficiently solid state is now retained in position at the bottom of the container by means of an inwardly extending annular bead 3. The fuel receptacle 4 is also of cylindrical cup-like form, being shallower than the germicide container, and preferably its inner curved surface extends in radial direction as shown in order to retain in position the fuel 5 which has been poured in molten condition into the receptacle. The wick 6, which is preferably conical in shape, having its apex pointed upward, is embedded in and held by the fuel, having been placed in the receptacle 4 while the fuel is still in a molten state. The fuel receptacle near its mouth is of less diameter than the germicide container near its mouth, and is adapted, when inverted, to be telescopically held within the said germicide container, and in this position it serves as a closure for the germicide container for the purpose of transportation.

The lower end of the germicide container is adapted to be telescopically held by a cylindrical supporting drum 7 whose lower end is adapted to telescopically hold the portion of the fuel receptacle near its mouth, when the same is used as a burner, and to be supported thereby, the upper edge of this drum engaging the outwardly extending annular bead 8 of the germicide container. When the fuel receptacle is in such position in the lower end of this drum the drum serves as a body of the burner, and is provided with a multiplicity of perforations, as shown, to admit air to the burning fuel and also to act as a fire stop, preventing the flame from escaping outside of the perforated drum. When in this operative position the fuel receptacle rests upon a number of raised portions 9 which extend from the bottom thereof and space it away from the surface upon which it rests so that air may circulate under the bottom to prevent over-heating.

The user receives this fumigator as it has been assembled for transportation, as shown in Figs. 1 and 2, the fuel receptacle, being inverted and fitted into the upper end of the germicide container, and the drum telescoping the lower end of the said container. To put the device into operation it is necessary only to remove the fuel receptacle and place it right side up, light the apex of the wick, and then fit the lower end of the drum over the upper end of the fuel receptacle, whereupon the fuel will burn and evaporate the germicide within the container. The perforations in the drum admit enough air to the flame to produce a proper combustion and at the same time the drum confines the flame within it, preventing the accidental igniting of the gases which rise from the evaporating germicide, and thus eliminating the danger of conflagrations and explosions. The relative proportions of fuel and germicide should be such that there will be only sufficient fuel to evaporate all of the germicide within the container.

It will be seen that this invention affords a simple, safe and effective device for accomplishing the desired result, and the device may be cheaply made and put on the market at a low price. It is also very compact for shipping purposes, storage, etc.

Not confining ourselves to the exact construction herein shown or described, what we claim is:

A fumigator, comprising a cup like germicide container partially filled with a semi-solid germicide, an extension on the inner surface of the germicide container to retain the germicide, a cup like fuel container having a circumferential enlargement to retain a semi-solid fuel substance and a wick embedded in the fuel, a drum adapted to receive the germicide container at one end and the fuel container at the other end and forming therebetween a combustion chamber, the wall of said drum being perforated throughout to admit air for combustion, but the perforations being fine enough to form an effective fire stop, external circumferential shoulders on both of said containers to engage the respective ends of said drum, the fuel receptacle being adapted to fit into the mouth of the germicide container when packed for shipment, and for operative position to be removed therefrom and inserted into the end of the drum opposite the germicide container.

In testimony whereof we affix our signatures in presence of two witnesses.

JAMES PRICE.
WILLIAM G. WINTER.

Witnesses:
HENRY WINTER,
JOHN G. RUTGERS.

Copies of this patent may be obtained for five cents each, by addressing the "Commissioner of Patents, Washington, D. C."